(12) United States Patent  
Averett et al.

(10) Patent No.: US 8,732,156 B2
(45) Date of Patent: *May 20, 2014

(54) ONLINE SERVICE FOR PROGRAM LOOKUP (75) Inventors: Linda W. Averett, Medina, WA (US); Tariq Sharif, Redmond, WA (US); Roberto A. Franco, Seattle, WA (US); Anthony T. Chor, Bellevue, WA (US); Vishu Gupta, Bothell, WA (US); Venkatraman V. Kundallur, Redmond, WA (US); Joseph T. Farro, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/488,344

(22) Filed: Jun. 4, 2012

(65) Prior Publication Data

US 2012/0239693 A1 Sep. 20, 2012

Related U.S. Application Data (63) Continuation of application No. 11/424,805, filed on Jun. 16, 2006, now Pat. No. 8,195,640.

(51) Int. Cl.
*G06F 7/00* (2006.01)
*G06F 17/30* (2006.01)

(52) U.S. Cl.
USPC .......................................................... 707/712

(58) Field of Classification Search
USPC .................................. 707/712, 736
See application file for complete search history.

(56) References Cited

U.S. PATENT DOCUMENTS

| 6,182,086 | B1 | 1/2001 | Lomet et al. |
| 6,477,550 | B1 | 11/2002 | Balasubramaniam et al. |
| 6,763,395 | B1 | 7/2004 | Austin |
| 6,842,903 | B1 | 1/2005 | Weschler |
| 7,082,476 | B1 | 7/2006 | Cohen et al. |
| 7,107,315 | B1 | 9/2006 | Rodriguez et al. |
| 8,195,640 | B2 | 6/2012 | Averett |
| 2002/0132616 | A1 | 9/2002 | Ross et al. |
| 2002/0144011 | A1 | 10/2002 | Hinsley |
| 2002/0174257 | A1 | 11/2002 | Jones et al. |
| 2003/0084096 | A1* | 5/2003 | Starbuck et al. ............ 709/203 |
| 2004/0059776 | A1 | 3/2004 | Pitzel et al. |
| 2004/0098405 | A1 | 5/2004 | Zrubek et al. |
| 2005/0060420 | A1* | 3/2005 | Kovacevic .................. 709/231 |

(Continued)

OTHER PUBLICATIONS

"File Transfer Applications", *The Mac Orchard. Essential Internet Applications for Macintosh Users Since 1995.*, retrieved from <http://www.macorchard.com/filetransfer> on Apr. 10, 2006, 22 pages.

(Continued)

*Primary Examiner* — Khanh Pham
*Assistant Examiner* — Van Oberly
(74) *Attorney, Agent, or Firm* — Andrew Sanders; Micky Minhas; Wolfe-SBMC (57) ABSTRACT

An integrated program lookup browser provides an integrated system with an online program lookup web service that assists the user in finding these unrecognized files, protocols and web page objects by allowing the user to perform a program lookup on a web service that can search one or more databases and return the URL to download the appropriate application or protocol or return the actual program or protocol.

20 Claims, 11 Drawing Sheets

(56) References Cited

U.S. PATENT DOCUMENTS

| | | | |
|---|---|---|---|
| 2005/0086641 A1 | 4/2005 | Hussey | |
| 2005/0171981 A1 | 8/2005 | Molnar | |
| 2005/0216443 A1 | 9/2005 | Morton et al. | |
| 2005/0278651 A1 | 12/2005 | Coe et al. | |
| 2006/0059174 A1* | 3/2006 | Mese et al. | 707/100 |
| 2007/0294256 A1 | 12/2007 | Averett | |

OTHER PUBLICATIONS

"Final Office Action", U.S. Appl. No. 11/424,805, (Nov. 21, 2008), 12 pages.

"Final Office Action", U.S. Appl. No. 11/424,805, (Dec. 10, 2009), 13 pages.

"Final Office Action", U.S. Appl. No. 11/424,805, (Jun. 30, 2011), 17 pages.

"Final Office Action", U.S. Appl. No. 11/424,805, (Aug. 16, 2010), 13 pages.

"Find Missing Files and Folders", retrieved from <http://www.smart-projects.net/help.php?help=145> on Apr. 10, 2006, 4 pages.

"Missing Files & Components", retrieved from <http://www.snapfiles.com/help/missingfiles.html> Apr. 10, 2006, 4 pages.

"Non-Final Office Action", U.S. Appl. No. 11/424,805, (Jul. 2, 2009), 11 pages.

"Non-Final Office Action", U.S. Appl. No. 11/424,805, (Feb. 3, 2011), 13 pages.

"Non-Final Office Action", U.S. Appl. No. 11/424,805, (Mar. 16, 2010), 14 pages.

"Non-Final Office Action", U.S. Appl. No. 11/424,805, (Mar. 31, 2008), 8 pages.

"Notice of Allowance", U.S. Appl. No. 11/424,805, (Feb. 6, 2012), 13 pages.

Anderson, Kenneth M., et al., "Integrating Open Hypermedia Systems with the World Wide Web", In *Proceedings of the Eighth ACM Conference on Hypertext*, (Apr. 1997), 10 pages.

Cabell, V, Benjamin et al., "Using Java to Develop Interactive Learning Material for the World-Wide Web", In *International Journal of Engineering Education*; vol. 13, Issue 6, (Jun. 1, 1997), 10 pages.

Romer, Cynthia R., "A Composable Architecture for Scripting Multimedia Network Applications", In *Masters Report*, University of California, (Jul. 1998), 32 pages.

* cited by examiner

ONLINE SERVICE FOR PROGRAM LOOKUP

RELATED APPLICATIONS

This application claims priority to U.S. patent application Ser. No. 11/424,805, filed Jun. 16, 2006, entitled "Online Service For Program Lookup", the disclosure of which is incorporated in its entirety by reference herein.

TECHNICAL FIELD

This description relates generally to application programs and more specifically to integrating web browsers and web services to provide an integrated program lookup service for users.

BACKGROUND

Web browsers are increasingly used to access information on the World Wide Web ("WWW"). As this use has increased so have the types of information being accessed. Some information may be unrecognized by the browser. Likewise, the format of the information may be unintelligible. Often the user may not be able to access or process the information without downloading another application. Conventional browsers are typically unable to assist the user in accessing unrecognized files, protocols, or web page objects that may require unrecognized applications to load within the browser using an online program lookup. Typically, users have to search for these unrecognized programs and protocols if they are not already present on the user's computer.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An integrated program lookup browser provides an integrated system with an online program lookup web service that assists the user in finding these unrecognized files, protocols and web page objects by allowing the user to perform a program lookup on a web service that can search one or more databases and return the URL to download the appropriate application or protocol or return the actual program.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe an online service for program lookup. Although the present examples are described and illustrated herein as being implemented in a browser system, the system described is provided as an example and not a limitation. As those skilled in the art will appreciate, the present examples are suitable for application in a variety of different types of program lookup systems.

Figure 1:
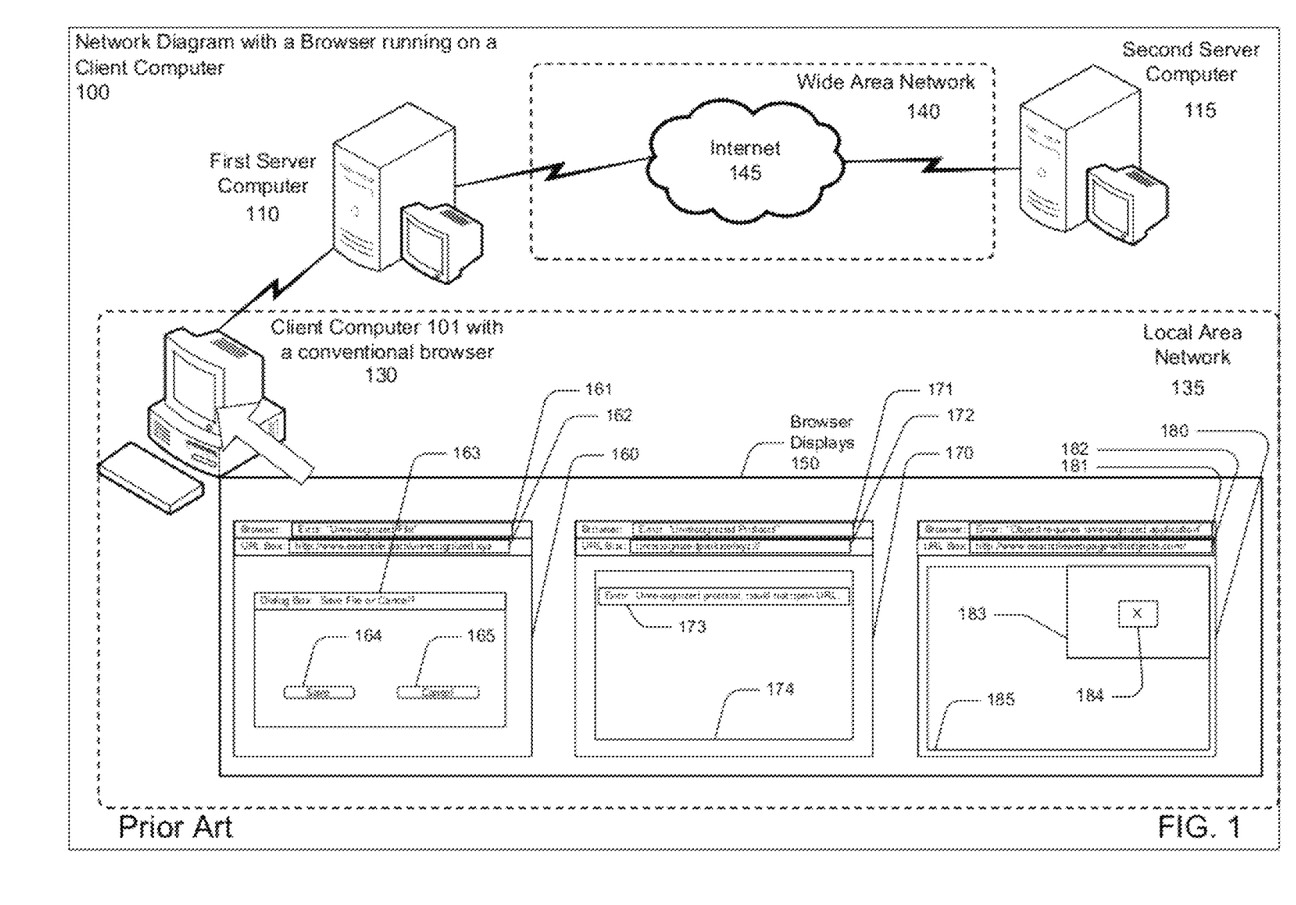
FIG. 1 is a network diagram of a conventional computer network including a client computer running a conventional browser that typically does not provide program lookup.

FIG. 1 is a network diagram showing a conventional system 100 including a client computer running a conventional browser 130 that typically does not provide program lookup. The conventional browser is typically disposed on a conventional PC, client computer or equivalent 130. The conventional client computer 130 may be coupled via a conventionally constructed local area network 135 to a conventional first server computer 110. The first server computer 110 may be coupled to a conventional wide area network 140, which may include a conventional Internet connection 145 to a conventional second server computer 115.

The local area network 135 may include a plurality of conventional computers (not shown) and conventional peripheral equipment (not shown) coupled together utilizing conventional topologies (token, star and the like) and conventional switching equipment. Computing devices 130, 110, 115, and the like may include televisions, VCRs, cellular telephones, appliances and the like. These computing devices may be coupled to the Internet utilizing conventional techniques known to those skilled in the art.

The local area network 135 may include a conventionally constructed ISP network in which a number, or plurality, of subscribers may utilize telephone dial up, ISDN, DSL, cellular telephone, cable modem, or similar connections to couple their computer to one or more server computers 115 that provide a connection to the World Wide Web 140 via the Internet 145.

The wide area network or World Wide Web 140 is conventionally constructed and may include the Internet 145 or equivalent structure for providing a wide area network. The wide area network may couple to any number of computers through any number of wide area and local area connections.

A computing device running a conventional browser 130 may include a conventional operating system. The computing device running a conventional browser 130 may produce a browser display 150. In addition to displaying information that may be retrieved over the World Wide Web, other information 160, 170, and 180 may be displayed. For example, the browser displays 150 may be displayed from time to time if the user attempts to access an unrecognized file 160, protocol 170, or web page object 180.

The exemplary unrecognized file conventional browser display 160 is an illustration of what a user would see on a computer screen when using a browser to access a file with an unrecognized file extension. When the user clicks on a link or navigates to a file by typing a location into the URL box 162 that has an unrecognized file extension, the Browser 160 searches the registry for the file handler that provides the correct application to use to open the file but is unable to find it. When this occurs the Browser 160 displays an error 161 and prompts the user with a dialog box 163 that gives the user the option to save the file to disk 164 or cancel the attempt to open the file 165.

The exemplary unrecognized protocol browser display 170 is an illustration of what a user would see on a computer screen when using a browser to access a file or link with an unrecognized protocol. When the user clicks on a link or navigates to a file by typing a location into the URL box using an unrecognized protocol 172, the browser 170 may search the registry for the protocol handler but may be unable to find it. When this occurs the browser 170 may display an error 171 and a web page 174 with an error stating the browser 170 encountered an unrecognized protocol and could not open the URL 173.

The exemplary unrecognized web page object browser display 180 is an illustration of what a user would see on a computer screen when using a browser to load a web page containing an object that may require an unrecognized application to load the object within the browser. When the user navigates to a web page 182 containing an object 183 that may require an unrecognized application to load the object within the browser 180, the browser 180 searches the HTML code for the "Class ID" (CLSID) field located in the <Object> tag. The browser 180 searches the registry for the CLSID found in the web page to determine the correct application to use to load the object within the browser 180. If the CLSID is not found in the registry, the Browser 180 searches the HTML code for the codebase field located in the <Object> tag. The codebase field is typically where the URL for the web location for the Browser 180 to download the desired application to load the object 183 within the browser 180.

If the codebase is empty or missing, the Browser 180 may fail to load the object. This failure is typically a silent failure and may result in an error 181 which loads the web page 185 into the Browser 180 without the object loaded. The Browser 180 typically displays a default image 184 in place of the object.

Figure 2:
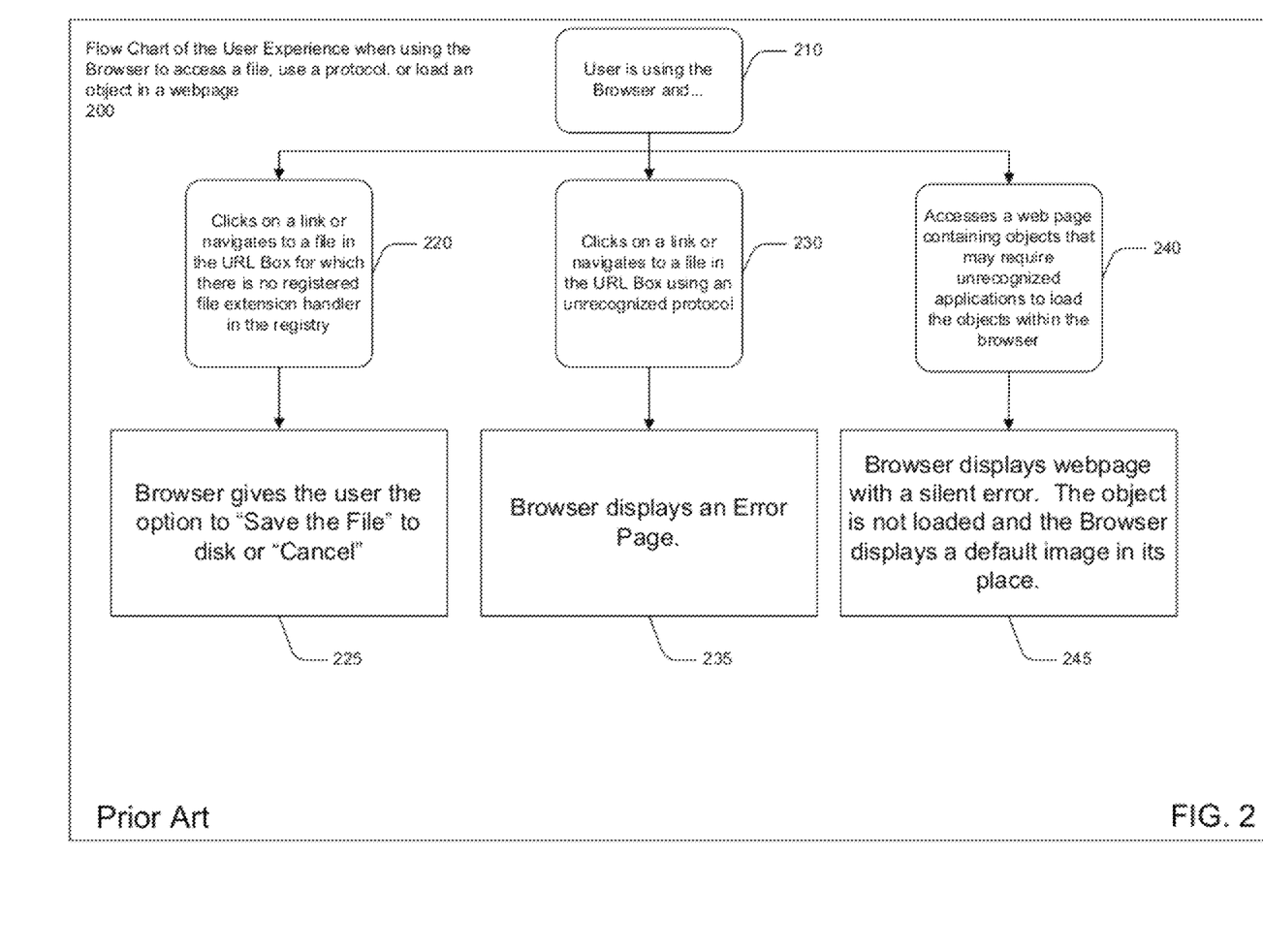
FIG. 2 is a flow chart of the conventional processes of operation of a conventional browser in saving a file with an unrecognized or unknown file extension to disk, displaying an error page when accessing a file or link with an unrecognized protocol, or displaying a web page with a silent error when loading a web page containing an object that may require an unrecognized application to load the object within the conventional browser.

FIG. 2 is a flow chart of the conventional processes of operation of a conventional browser saving a file to disk, for a file with an unrecognized file extension 225, for displaying an error page when accessing a file or link with an unrecognized protocol 235, or for displaying a web page with a silent error when loading a web page containing an object that requires an unrecognized application to load the object within the Browser 245. These are typically the options that may be presented when information that the browser is unable to process is encountered.

When the user is using the browser 210 to access a file by clicking on a link or navigating to the file by typing a location into the URL Box for which there may not be a registered file extension handler in the registry 220, the browser may give the user the option to either save the file to disk or cancel 225. When the user is using the browser 210 to access a file by clicking on a link or navigating to the file by typing a location into the URL box using an unrecognized protocol 230, the browser may display an error page 235 to the user.

When the user is using the browser 210 to access a web page that contains an object that may require an unrecognized application to load the object within the Browser 240, the browser 240 may display the web page without the object loaded and may substitute a default image in the object's place 245. One skilled in the art could implement a variety of displays or functions to occur in place of the object that could not load in the web page because it may require an unrecognized application.

Figure 3:
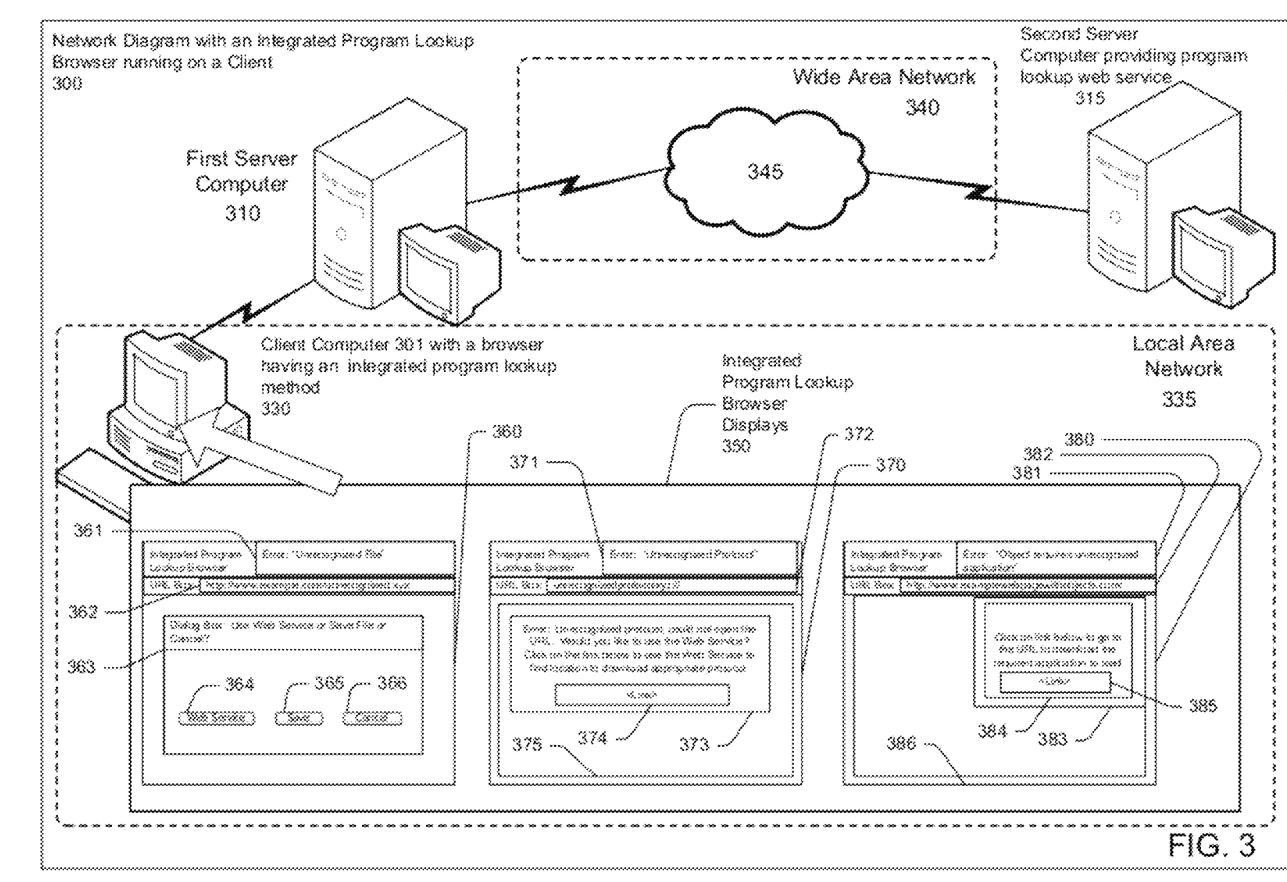
FIG. 3 is a network diagram of a computer network including a client computer running an integrated program lookup browser that may provide program lookup.

FIG. 3 is a network diagram of a computer network 300 including a client computer running an integrated program lookup browser 330. Such an integrated program lookup browser running on a client computer 330 performs program lookups for unrecognized files, protocols and objects that a user may access. The integrated program lookup browser is typically disposed on a PC, client computer or equivalent 330. The client computer 330 may be coupled via a conventionally constructed local area network 335 to a first server computer 310. The first server computer 310 may be coupled to a wide are network 340, which may include an internet connection 345 to a second server computer 315.

The local area network 335 may include a plurality of computers (not shown) and conventional peripheral equipment (not shown) coupled together utilizing conventional topologies (token, star and the like) and conventional switching. Computing devices 330, 310, 315, and the like may include televisions, VCRs, cellular telephones, appliances and the like. The computing devices may be coupled to the Internet utilizing conventional techniques known to those skilled in the art.

The local area network 335 may include a conventionally constructed ISP network in which a number or plurality of subscribers utilize telephone dial up, ISDN, DSL, cellular telephone, cable modem, or the like connections to couple their computer to one or more server computers 315 that provide a connection to the World Wide Web 340 via the Internet 345.

The wide area network or World Wide Web 340 is conventionally constructed and may include the Internet 345 or equivalent structure for providing a wide area network. The wide area network may couple to any number of computers through any number of wide area and local area connections. The client computer running the integrated program lookup browser 330 may include a conventional operating system and produce a browser display 350. The integrated program lookup browser may be structured to provide the program lookup capability and may present a service of integrated program lookup browser displays 350 that may include those for an unrecognized file extension 360, an unrecognized protocol 370, and an unrecognized web page object or application 380. Such displays tend to allow for cases of processing information that may be unrecognized by an application, such as a browser.

The unrecognized file extension display 360 is an illustration of what a user would see on a computer screen when using the integrated program lookup browser 350 to access a file with an unrecognized file extension. When the user clicks on a link or navigates to a file by typing a location into the URL box 362 that has an unrecognized file extension, the integrated program lookup browser 360 searches the registry for the file handler that provides the correct application to use to open the file but may be unable to find it. When this occurs, the integrated program lookup browser 360 may display an error 361 and may prompt the user with a dialog box 363 that gives the user the option to use the Web Service 364, save the file to disk 365, or cancel the attempt to open the file 366.

The unrecognized protocol display 370 is an illustration of what a user would see on a computer screen when using the integrated program lookup browser 350 to access a file or link with an unrecognized protocol. When the user clicks on a link or navigates to a file in the URL Box using an unrecognized protocol 372 the integrated program lookup browser 370 may search the registry for the protocol handler but may be unable to find it. When this occurs, the integrated program lookup browser 370 may display an error 371 and display a web page 375 with a message 373 providing the user with the option to use the web service to look for the unrecognized protocol by clicking on a link 374 that typically sends information to the web service.

The unrecognized web page object or application display 380 is an illustration of what a user would see on a computer screen when using the integrated program lookup browser 350 to load the object within the integrated program lookup browser. When the user navigates to a web page 382 containing an object 383 that may require an unrecognized application to load the object within the integrated program lookup browser 380, the integrated program lookup browser 380 may search the HTML code of the web page 386 for the "Class ID" (CLSID) field located in the <Object> tag for the object to be loaded 383. The integrated program lookup browser 380 may search the registry for the CLSID found in the web page 386 to determine the correct application to use to load the object within the integrated program lookup browser 380. If the CLSID is not found in the registry, the integrated program lookup browser 380 may search the HTML code of the web page 386 for the codebase field located in the <Object> tag of the object to be loaded 383.

The codebase field should have a URL for the location where the integrated program lookup browser 380 can download the desired application to load the object 383. If the codebase is empty or missing, the integrated program lookup browser 380 may automatically send the CLSID information to the web service to perform a program lookup. The web service may perform a program lookup using one or more databases and may send the URL for the integrated program lookup browser 380 to access to download the desired application. The integrated program lookup browser 380 may load the web page 386 and may display a message 384 providing the user the option to download the required application to create an instance of the object in the web page 386 by clicking on the link 385 that directs the user to the URL found by the web service. After the user clicks on the link 385 to the URL, the user may have the option to download the required application to load the object 383.

Figure 4:
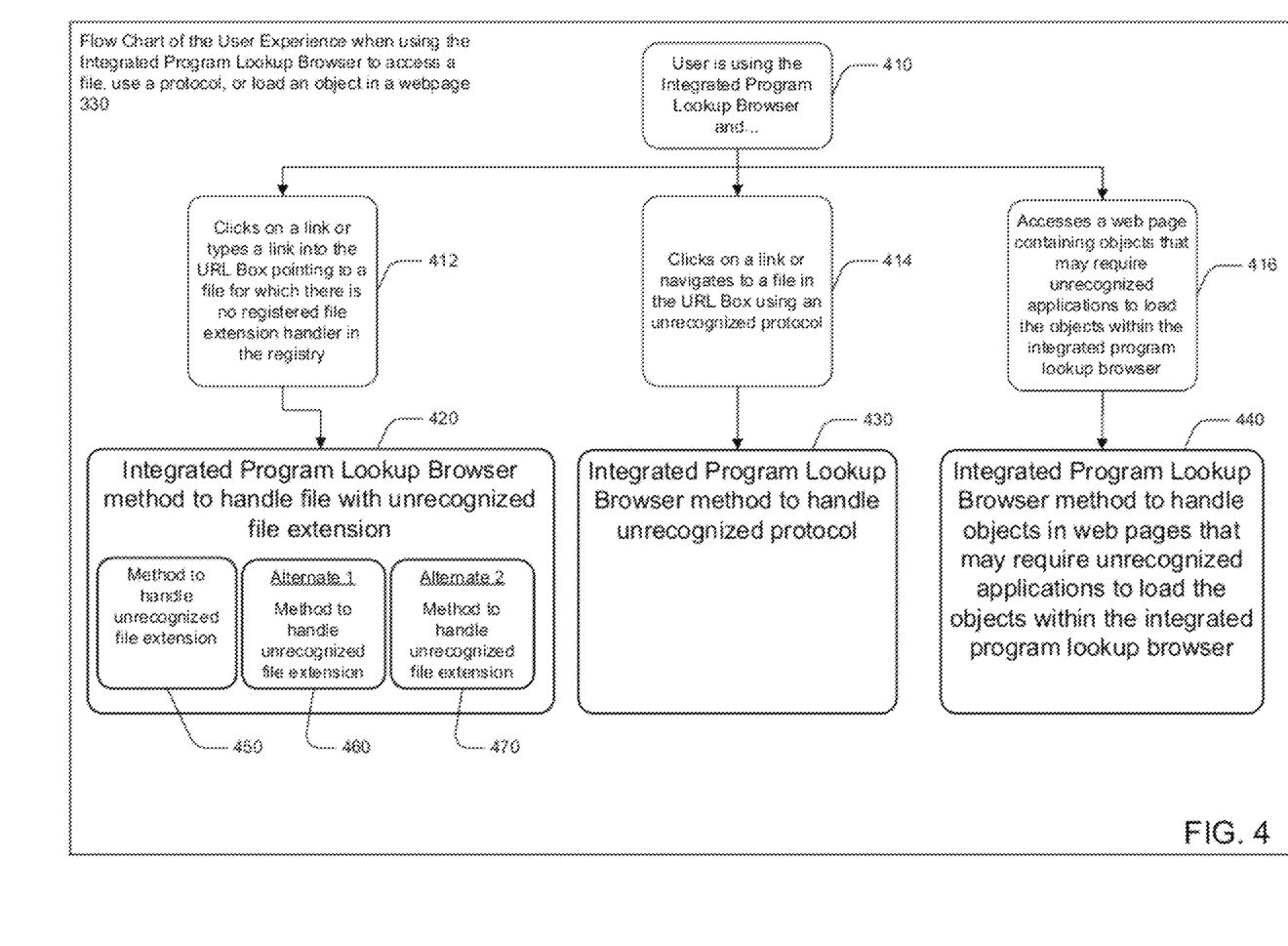
FIG. 4 is a flow chart of the processes of operation of an integrated program lookup browser to, lookup a file with an unrecognized file extension, lookup an unrecognized protocol, or lookup an object in web page that may require an unrecognized application to load the object within the integrated program lookup browser.

FIG. 4 is a flow chart of the processes of operation of an integrated program lookup browser to lookup a file with an unrecognized file extension, lookup an unrecognized protocol, or lookup an object in web page with an unrecognized application to load the object within the integrated program lookup browser. When the user is using the integrated program lookup browser 410 to access a file by clicking on a link or navigating to the file by typing a location into the URL Box for which there is not a registered file extension handler in the registry 412, the integrated program lookup browser may then use a method to handle a file with an unrecognized file extension 420.

The method communicates information about the unrecognized file extension to an online web service. The integrated program lookup browser can implement three variations 450, 460, 470 of the method to handle a file with an unrecognized file extension. Each of the variations 450, 460, 470 of the method to handle the unrecognized file extension typically sends information to the web service. The variations will be described in further detail below.

Now we return to block 410, where the user is using the integrated program lookup browser. Next the user accesses a file by clicking on a link or navigating to the file by typing a location into the URL Box using an unrecognized protocol 414. Then the integrated program lookup browser may use a method to handle an unrecognized protocol 430. The method to handle an unrecognized protocol typically sends information to the web service to perform a program lookup to determine the URL of the location to download the appropriate protocol or find the actual protocol.

Again returning to block 410, where the user is using the integrated program lookup browser. Next the user accesses a web page that contains an object that may require an unrecognized application to load the object within the integrated program lookup browser 416. Then the integrated program lookup browser uses a method to handle objects in web pages that may require an unrecognized application to load the object within the integrated program lookup browser 440. The method to handle these objects 440 may send information to the web service to perform a program lookup to determine the URL of the location to download the appropriate application or find the actual application. The methods 420, 430, and 440 as well as the variations (450, 460, and 470) of method 420 will now be described in more detail below.

Figure 5:
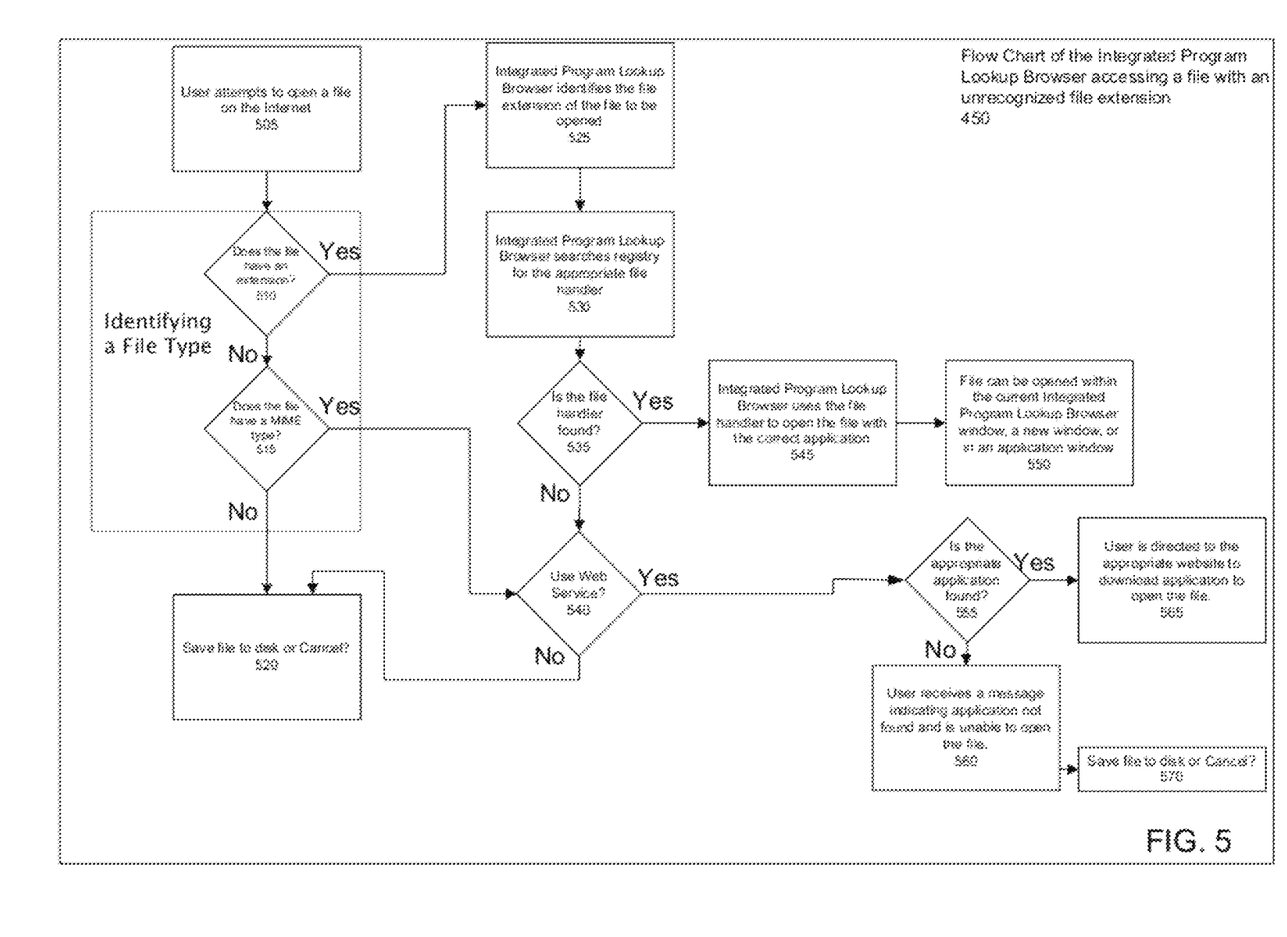
FIG. 5 is a flow chart of the process to lookup a file with an unrecognized file extension.

FIG. 5 is a flow chart of the process the integrated program lookup browser follows to lookup a file with an unrecognized file extension 450. First the user attempts to open a file on the Internet 505. Then the integrated program lookup browser checks to see if the file has an extension 510.

If the file has an extension, the integrated program lookup browser identifies the extension of the file 525. Next the registry is searched for the appropriate file handler 530. Then the integrated program lookup browser determines if the file handler is found 535.

If the file handler is found, the integrated program lookup browser uses the file handler to open the file with the correct application 545. The file can be opened within the current integrated browser window, a new integrated browser window, or in a separate application window 550.

Returning to 535, if the file handler is not found, the user may be given the option to use the web service 540. If the user chooses to use the web service, the integrated program lookup browser may send the file extension as data to the web service. The web service may perform a program lookup on one or more databases to find the appropriate application to access the file 555. If the appropriate application is found, the integrated program lookup browser may receive the URL of the website to download the application from the web service or may receive the actual application 565.

Returning to 555, if the appropriate application is not found by the web service, the user may receive a message indicating the application could not be found and the file could not be opened 560. The integrated program lookup browser may prompt the user to either save the file to disk or cancel the operation 570.

Returning to 540, if the user decides not to use the web service, the integrated program lookup browser may prompt the user to save the file to disk or cancel the operation 520.

Returning to 510, if the file does not have an extension, the integrated program lookup browser checks to see if the file has a MIME type 515. If the file has a MIME type 516, it offers the user a choice to use the web service 540.

Returning to 540, if the user decides not to use the web service, the integrated program lookup browser may prompt the user to save the file to disk or cancel the operation 520. Returning to 515, if the file does not have a MIME type 517, the integrated program lookup browser may prompt the user to save the file to disk or cancel the operation 520.

Figure 6:
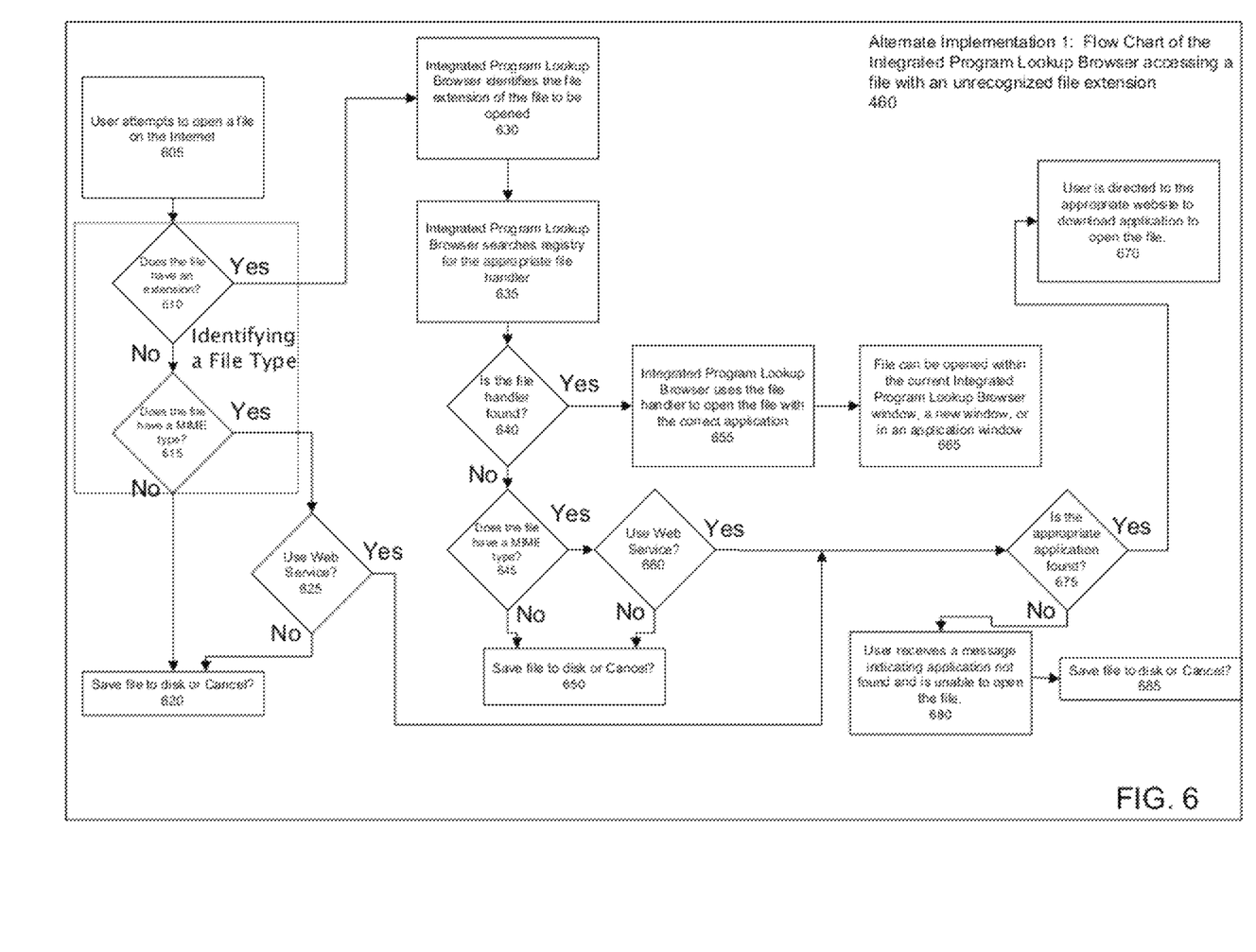
FIG. 6 is a flow chart of a first alternate process to lookup an unrecognized file extension.

FIG. 6 is a flow chart of a first alternate process the integrated program lookup browser follows to lookup an unrecognized file extension 460. First the user attempts to open a file on the Internet 605. Then the integrated program lookup browser checks to see if the file has an extension 610.

If the file has an extension, the integrated program lookup browser identifies the extension of the file 630. Then the registry is searched for the appropriate file handler 635. The integrated program lookup browser determines if the file handler is found 640.

If the file handler is found, the integrated program lookup browser uses the file handler to open the file with the correct application 655. The file can be opened within the current integrated browser window, a new integrated browser window, or in a separate application window 665.

Returning to 640, if the file handler is not found, the integrated program lookup browser checks to see if the file has a MIME type 645. If the file has a MIME type, the user is given the option to use the web service 660. If the user chooses to use the web service, the integrated program lookup browser may send the file extension and MIME type as data to the web service. The web service may perform a program lookup on one or more databases to find the appropriate application to access the file 675. If the appropriate application is found 676, the integrated program lookup browser may receive the URL of the website to download the application from the web service or may receive the actual application 670.

Returning to 675, if the appropriate application is not found by the web service, the user may receive a message indicating the application could not be found and the file could not be opened 680. The integrated program lookup browser may prompt the user to either save the file to disk or cancel the operation 685.

Returning to 660, if the user chooses not to use the web service 662, the integrated program lookup browser may prompt the user to save the file to disk or cancel the operation 650.

Returning to 645, if the file does not have a MIME type, the user is also given the option to save the file to disk or cancel 650.

Returning to 610, if the file does not have an extension, the integrated program lookup browser checks to see if the file has a MIME type 615. If the file has a MIME type, the integrated program lookup browser may give the user the option to use the web service 625. If the user chooses to use the web service 626, the integrated program lookup browser sends the MIME type as data to the web service.

Returning to 625, if the user chooses not to use the web service, the integrated program lookup browser may prompt the user to save the file to disk or cancel the operation 620.

Returning to 615, if the file does not have a MIME type, the user is also given the option to save the file to disk or cancel 620.

Figure 7:
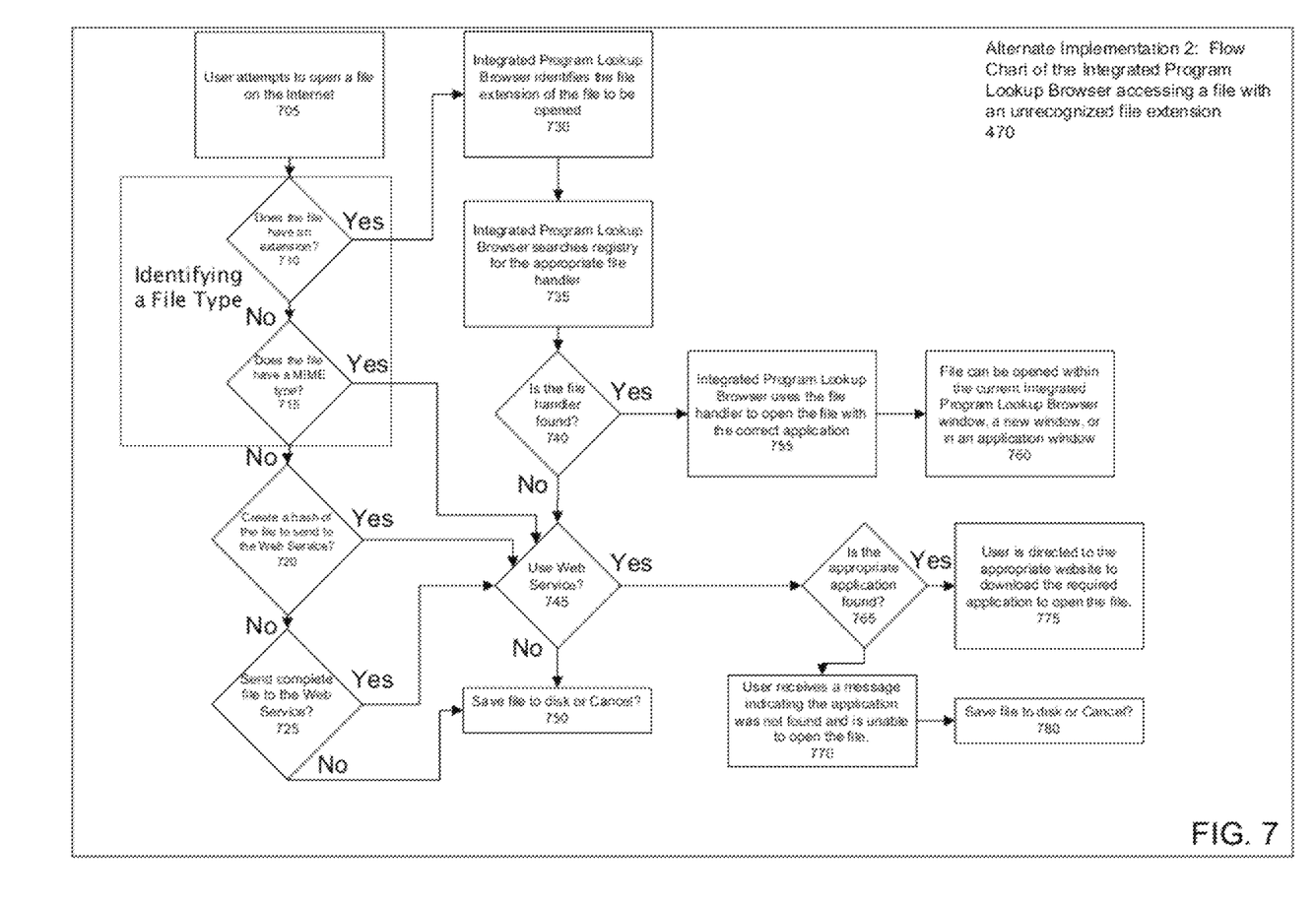
FIG. 7 is a flow chart of a second alternate process to lookup an unrecognized file extension.

FIG. 7 is a flow chart of a second alternate process the integrated program lookup browser follows to lookup an unrecognized file extension 470. First the user attempts to open a file on the Internet 705. Then the integrated program lookup browser checks to see if the file has an extension 710.

If the file has an extension, the integrated program lookup browser identifies the extension of the file 730. Next the registry is searched for the appropriate file handler 735. Then the integrated program lookup browser determines if the file handler is found 740.

If the file handler is found, the integrated program lookup browser uses the file handler to open the file with the correct application 755. The file can be opened within the current integrated browser window, a new integrated browser window, or in a separate application window 760.

Returning to 740, if the file handler is not found, the integrated program lookup browser gives the user the option to use the web service 745. If the user chooses to use the web service, the integrated program lookup browser sends the file extension as data to the web service. The web service may perform a program lookup on one or more databases to find the appropriate application to access the file 765. If the appropriate application is found, the integrated program lookup browser may receive the URL of the website to download the application from the web service or may receive the actual application 775.

Returning to 765, if the appropriate application is not found by the web service, the user may receive a message indicating the application could not be found and the file could not be opened 770. Next the integrated program lookup browser may prompt the user to either save the file to disk or cancel the operation 780.

Returning to 745, if the user chooses not to use the web service, the user may be prompted to save the file to disk or cancel the operation 750.

Returning to 710, if the file does not have a file extension, the integrated program lookup browser checks to see if the file has a MIME type 715. If the file has a MIME type, the integrated program lookup browser may give the user the option to use the web service 745.

Returning to 715, if the file does not have a MIME type, the integrated program lookup browser gives the user the option to create a hash of the file to send to the web service 720. If the user chooses to create a hash of the file, the user is given the option to use the web service 745.

Returning to 720, if the user does not wish to create a hash of the file, the integrated program lookup browser gives the user the option to send the entire file to the web service 725. If the user decides to send the complete file, the user is given the option to use the web service 745

Returning to 725, if the user does not want to send the file to the web service, the user is given the option to save the file to disk or cancel 750.

Figure 8:
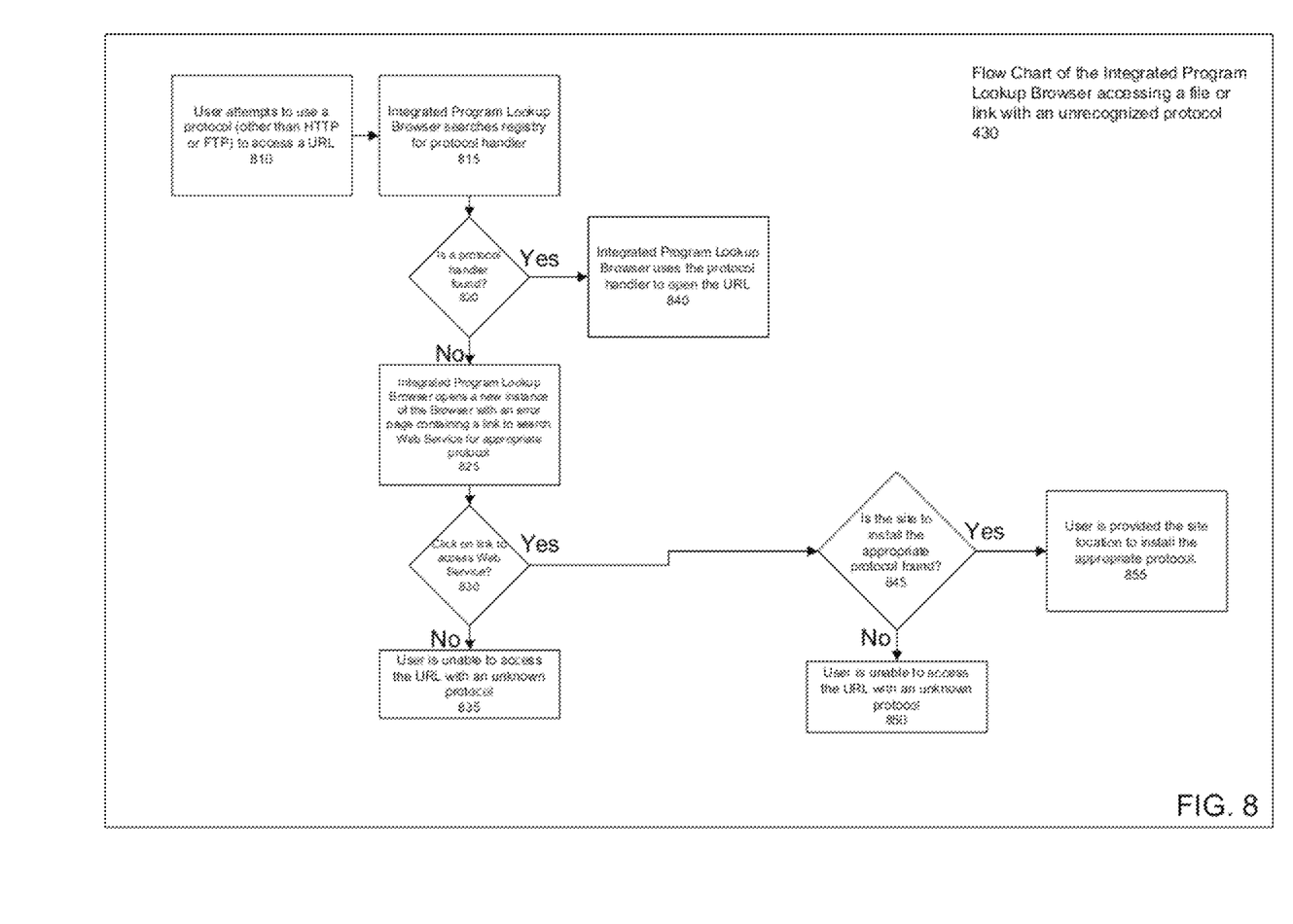
FIG. 8 is a flow chart of the process to lookup an unrecognized protocol.

FIG. 8 is a flow chart of the process the integrated program lookup browser follows to lookup an unrecognized protocol 430. First the user attempts to open a file on the Internet using an unrecognized protocol 810. Then the integrated program lookup browser searches the registry for the appropriate protocol handler 815. The integrated program lookup browser determines if the protocol handler is found 820. If the protocol handler is found, the integrated program lookup browser uses the protocol handler to open the file 840.

Returning to 820, if the protocol handler is not found, the integrated program lookup browser may open a new window with an error page and a link to use the web service 825. The user is given the option to click on the link to use the web service 830. If the user chooses to click on the link 831, the integrated program lookup browser may send the unrecognized protocol as data to the web service. The web service may perform a protocol lookup on one or more databases to find the appropriate protocol to access the file 845. If the appropriate protocol is found, the integrated program lookup browser may receive the URL of the website to download the protocol from the web service or may receive the actual protocol 855. Returning to 845, if the appropriate protocol is not found by the web service, the user may receive a message indicating the protocol could not be found and the URL could not be accessed 850.

Returning to 830, if the user chooses not to click on the link, the URL could not be opened using the unrecognized protocol 835.

Figure 9:
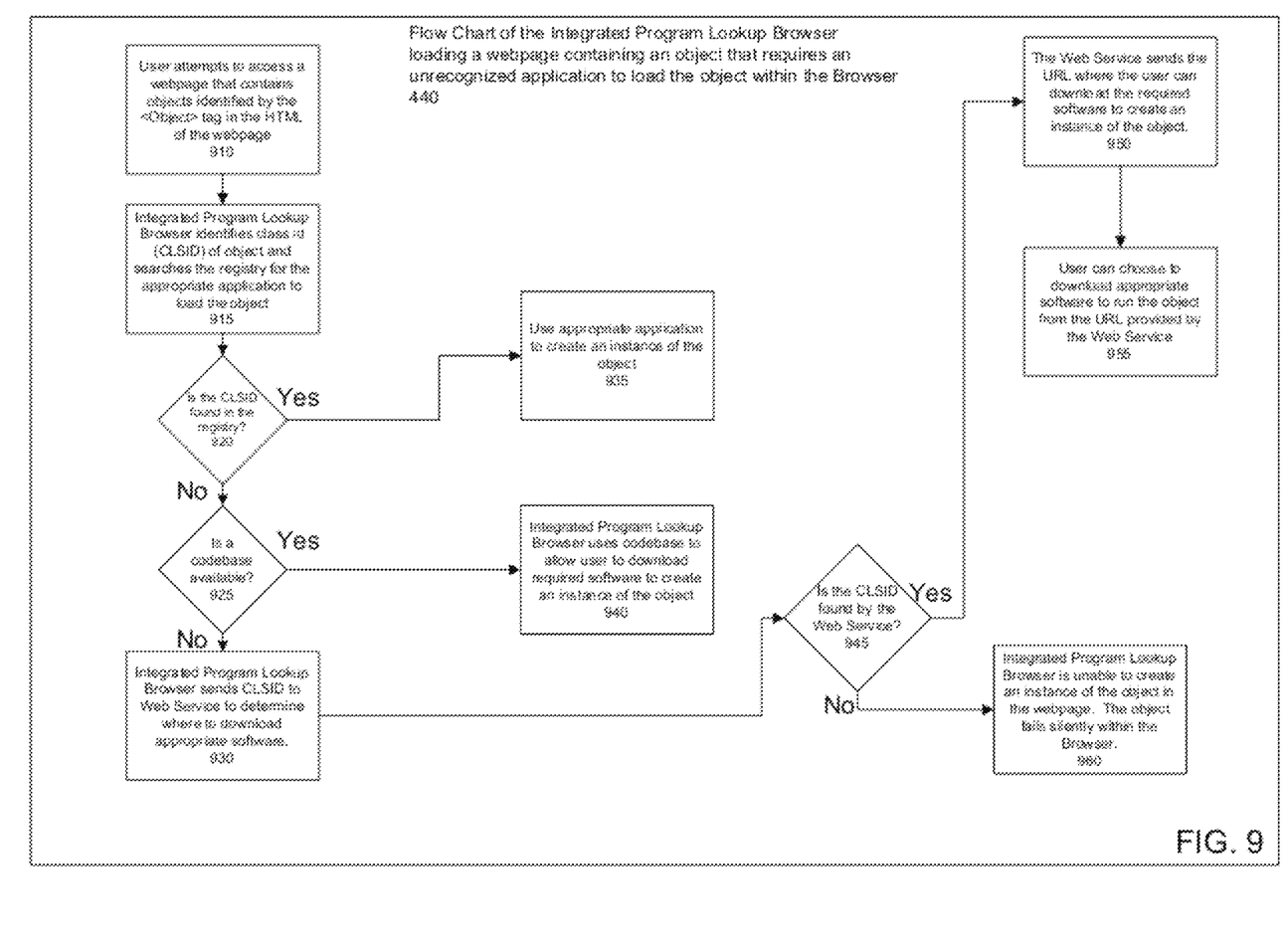
FIG. 9 is a flow chart of the process to lookup an object in a web page that may require an unrecognized application to load the object within the integrated program lookup browser.

FIG. 9 is a flow chart of the process the integrated program lookup browser follows to lookup an object in a web page that may require an unrecognized application to load the object within the integrated program lookup browser 440. First the user attempts to access a web page containing objects identified by the <Object> tag 910. Next the integrated program lookup browser searches the HTML code of the web page, identifies the "Class Id" (CLSID) of the object from the <Object> tag, and searches the registry for the appropriate application to load the object 915. The integrated program lookup browser determines if the CLSID is found in the registry 920.

If the CLSID is found in the registry, the integrated program lookup browser uses the application associated with the CLSID in the registry 935 to load an instance of the object in the web page.

Returning to 920, if the CLSID is not found in the registry, the integrated program lookup browser may search the HTML code of the web page for the codebase field associated with the <Object> tag of the object to be loaded 925.

If the codebase contains a URL, the integrated program lookup browser uses the codebase to give the user the option to download the required application to create an instance of the object in the integrated program lookup browser 940.

Returning to 925, if the codebase is blank or empty, the integrated program lookup browser may send the CLSID of the object as data to the web service 930. The web service may perform a program lookup for the CLSID in one or more databases. The web service determines if the CLSID is found in the one or more databases 945.

If the CLSID and the appropriate program are found, the integrated program lookup browser may load a default image within the web page in place of the object 950. Next it may give the user the option to download the required software from the URL that was found by the web service or download the software from the web service 955.

Returning to 945, if the appropriate application is not found by the web service, the integrated program lookup browser may load the web page with a silent error and a default image may be loaded within the web page in place of the object 960.

Figure 10:
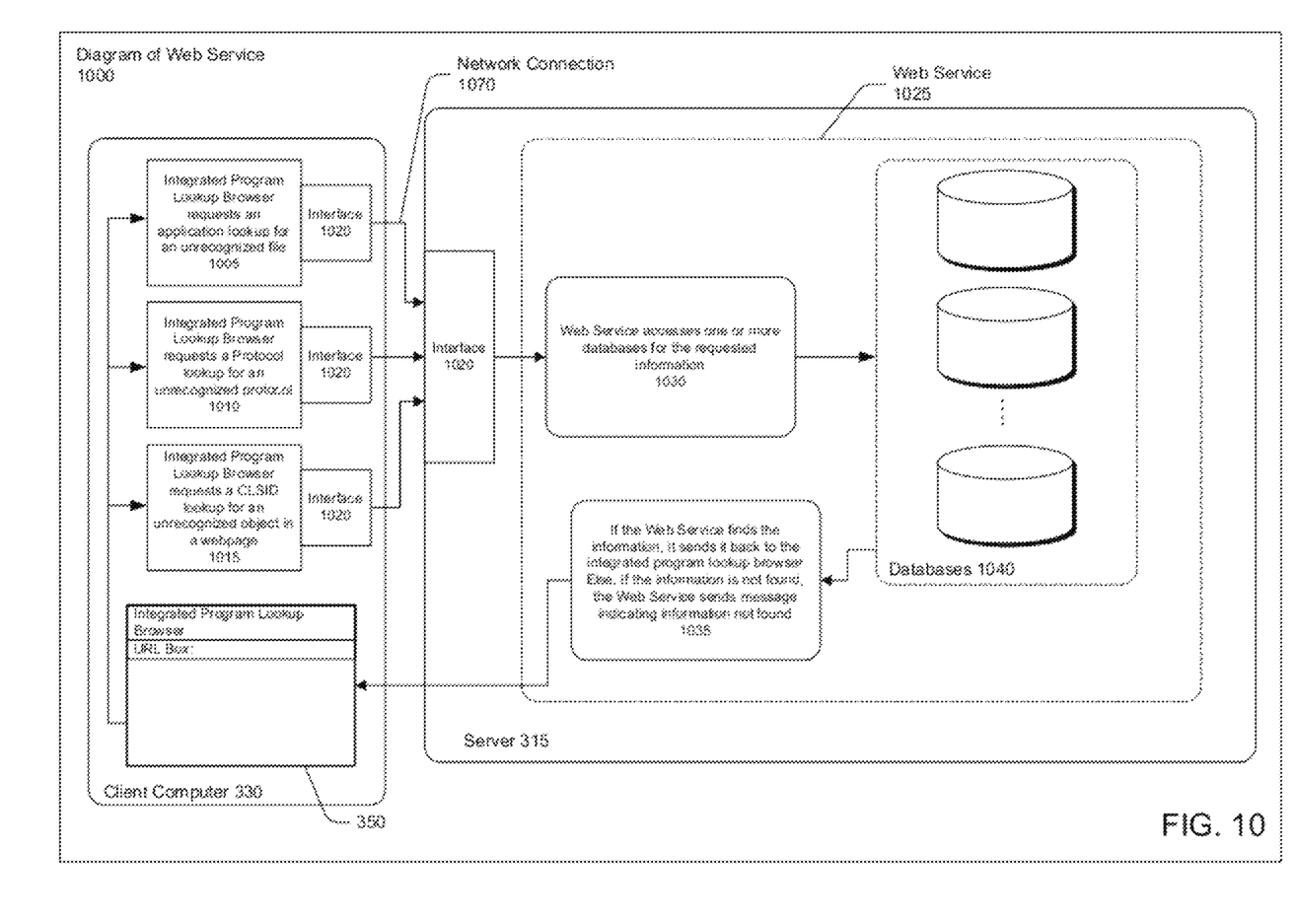
FIG. 10 is a diagram of a web service providing the online program lookup service to the integrated program lookup browser.

FIG. 10 is a diagram of a server 315 providing a program lookup web service 1000 to the integrated program lookup browser 350 running on a client computer 330. The server 315 can be a single server, a cluster of servers, and the like. When the user chooses to use the web service, the integrated program lookup browser may request an application look up for an unrecognized file extension 1005, a protocol lookup for an unrecognized protocol 1010, or a CLSID lookup for an object that may require an unrecognized application to load within the integrated program lookup browser 1015.

The integrated program lookup browser 350 may communicate with the web service 1025 through an interface 1020 over a network connection 1070. Each request may be sent from the integrated program lookup browser 350 through an interface 1020 with the web service 1025. The interface 1020 can transmit and receive data through a query string, through the HTTP POST protocol 1020, or their equivalent.

The web service 1025 may be composed of one or more databases 1040 containing URLs for programs and protocols. Those skilled in the art will realize that any variety of information could be contained on one or more databases 1040. When the integrated program lookup browser requests a lookup by the web service 1025, the web service accesses the one or more databases 1030.

After completing the search of the one or more databases 1040, the web service sends the appropriate information back to the integrated program lookup browser 350. The information sent back may be the URL to download the desired program or protocol necessary to access a file or link, may be the actual program or protocol, or may be a notification that no information could be found. The integrated program lookup browser 350 receives the information from the web service 1025 and may notify the user.

Figure 11:
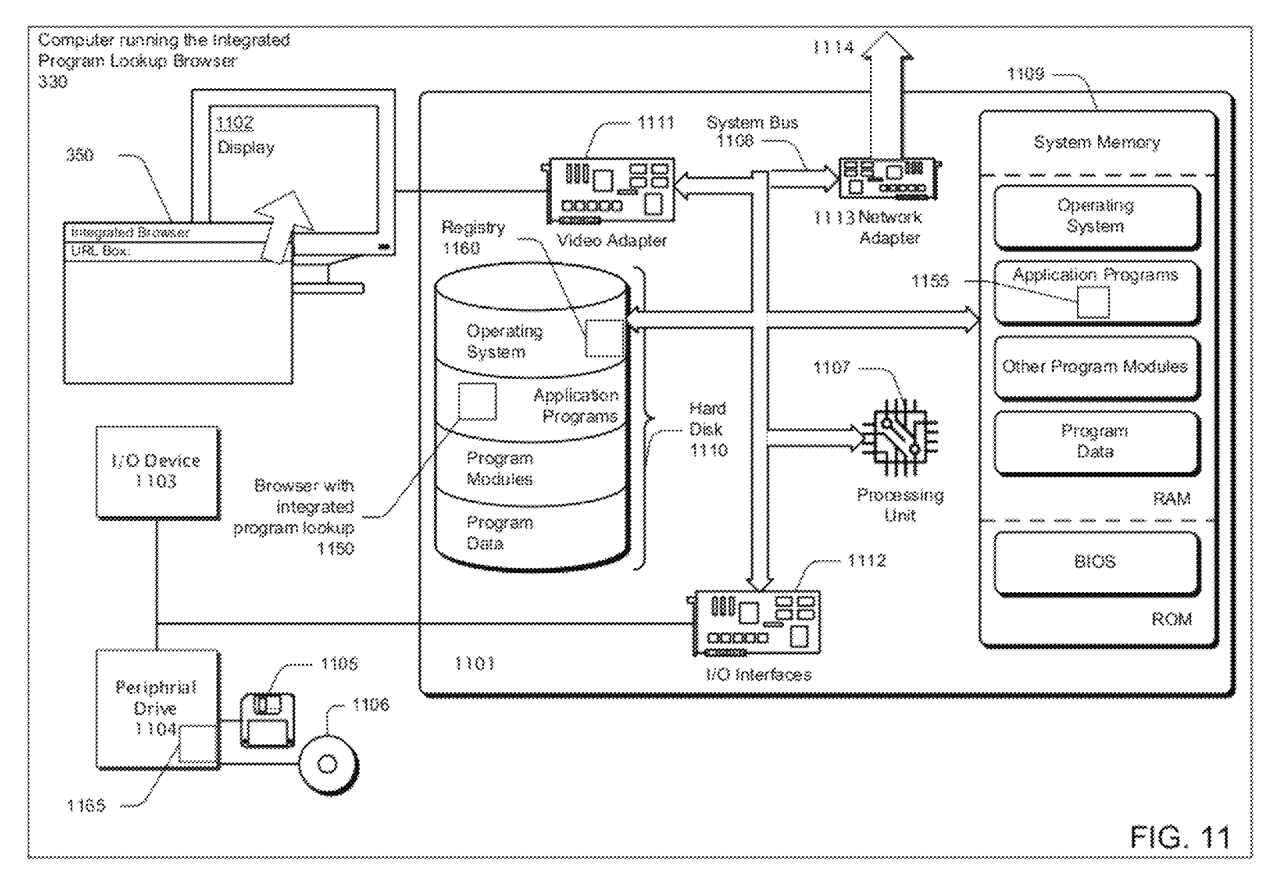
FIG. 11 is a diagram of an ingenious computer that may run the integrated program lookup browser.

FIG. 11 is a diagram of an exemplary computer environment 330 that may provide processing for the method of integrated program lookup browser described in this application. Exemplary computing environment 330 is only one example of a computing system and is not intended to limit the examples described in this application to this particular computing environment. The integrated program lookup browser may be loaded onto the computer 330 through the use of computer readable media 1105, 1106 or over a network 1114. Once loaded onto the computer 330 the method may reside as an application program 1150 and as part of the registry 1160 on an internal hard drive 1110. When processing, the method may also exist as an application program 1155 loaded into system memory 1109.

For example the computer 330 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

The computer 330 includes a general-purpose computing system in the form of a computing device 1101. The components of computing device 1101 can include one or more processors (including CPUs, GPUs, microprocessors and the like) 1107, a system memory 1109, a system bus 1108 that couples the various system components, and the method described above. Processor 1107 processes various computer executable instructions, including those to execute and run the integrated program lookup browser 350 to control the operation of computing device 1101 and to communicate with other electronic and computing devices (not shown). The system bus 1108 represents any number of several types of bus structures, including a memory bus or memory controller, a peripheral bus, an accelerated graphics port, and a processor or local bus using any of a variety of bus architectures.

The system memory 1109 may include computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 1107. The integrated program lookup browser 1155 may be stored in RAM and may be accessible to and/or presently operated on by one or more of the processors 1107.

Mass storage devices 1104 may be coupled to the computing device 1101 or incorporated into the computing device by coupling to the buss. Such mass storage devices 1104 may include a magnetic disk drive which reads from and writes to a removable, non-volatile magnetic disk (e.g., a "floppy disk") 1105, or an optical disk drive that reads from and/or writes to a removable, non-volatile optical disk such as a CD-ROM or the like 1106. Computer readable media such as 1105, 1106 typically embody computer readable instructions, data structures, program modules and the like supplied on floppy disks, CDs, portable memory sticks and the like. The integrated program lookup browser 1165 may be provided to the CPU 1101 by the peripheral device 1104.

The methods previously described may be disposed on these computer readable media.

Any number of program modules can be stored on the hard disk 1110, Mass storage devices 1104, ROM and/or RAM 1109, including by way of example, an operating system, one or more application programs, other program modules, and program data. The integrated program lookup browser 1150 may be stored on the hard disk 1110 or made available through a peripheral drive 1104. The registry 1160 of the operating system may be stored on the hard disk 1110 or made available through a peripheral drive 1104. The registry 1160 provides the integrated program lookup browser the data to search for a file handler, a protocol handler, or an application that may be required to load an object within the integrated program lookup browser. Each of such operating system, application programs, other program modules and program data (or some combination thereof) may include an embodiment of the systems and methods described herein.

A display device 1102 can be connected to the system bus 1108 via an interface, such as a video adapter 1111. The display device 1102 displays the integrated program lookup browser 350 to the user. A user can interface with computing device 1102 via any number of different input devices 1103 such as a keyboard, pointing device, joystick, game pad, serial port, and/or the like. These and other input devices are connected to the processors 1107 via input/output interfaces 1112 that are coupled to the system bus 1108, but may be connected by other interface and bus structures, such as a parallel port, game port, and/or a universal serial bus (USB).

Computing device 330 can operate in a networked environment using connections to one or more remote computers through one or more local area networks (LANs), wide area networks (WANs) and the like. The computing device 1101 is connected to a network 1114 via a network adapter 1113 or alternatively by a modem, DSL, ISDN interface or the like.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method comprising:
receiving, at a program lookup web service, a request to look up an unrecognized file, an unrecognized protocol, or an unrecognized object, the request received from an integrated program lookup browser that is configured to handle unrecognized files, unrecognized protocols, and unrecognized objects, the program lookup web service configured to interface with the integrated program lookup browser over a network connection, the program lookup web service configured to search one or more databases to find URLS of applications capable of opening unrecognized files, URLS of protocol handlers capable of accessing web pages with unrecognized protocols, and URLS of applications capable of loading unrecognized objects;
searching the one or more databases to find an application capable of opening the unrecognized file, a protocol handler capable of accessing the web page with the unrecognized protocol, or an additional application capable of loading the unrecognized object; and
sending, to the integrated program lookup browser, a URL to download the application, the protocol handler, or the additional application.

2. The method of claim 1, wherein:
the receiving comprises receiving a request to look up the unrecognized file;
the searching comprises searching one or more databases to find the application capable of opening the unrecognized file; and
the sending comprises sending the URL to download the application.

3. The method of claim 2, further comprising sending, to the integrated program lookup browser, a message indicating that the application was not found if the application is not found in the one or more databases.

4. The method of claim 1, wherein:
the receiving comprises receiving a request to look up the unrecognized protocol;
the searching comprises searching one or more databases to find the protocol handler capable of accessing the web page with the unrecognized protocol; and
the sending comprises sending the URL to download the protocol handler.

5. The method of claim 4, further comprising sending, to the integrated program lookup browser, a message indicating that the protocol handler was not found if the protocol handler is not found in the one or more databases.

6. The method of claim 1, wherein:
the receiving comprises receiving a request to look up the unrecognized object;
the searching comprises searching one or more databases to find the additional application capable of loading the unrecognized object; and
the sending comprises sending the URL to download the additional application.

7. The method of claim 6, further comprising sending, to the integrated program lookup browser, a message indicating that that the additional application was not found if the additional application is not found in the one or more databases.

8. One or more computer-readable storage devices comprising computer readable instructions which, when executed, implement a method comprising:
    receiving, at a program lookup web service, a request to look up an unrecognized file, an unrecognized protocol, or an unrecognized object, the request received from an integrated program lookup browser that is configured to handle unrecognized files, unrecognized protocols, and unrecognized objects, the program lookup web service configured to interface with the integrated program lookup browser over a network connection, the program lookup web service configured to search one or more databases to find URLS of applications capable of opening unrecognized files, URLS of protocol handlers capable of accessing web pages with unrecognized protocols, and URLS of applications capable of loading unrecognized objects;
    searching the one or more databases to find an application capable of opening the unrecognized file, a protocol handler capable of accessing the web page with the unrecognized protocol, or an additional application capable of loading the unrecognized object; and
    sending, to the integrated program lookup browser, a URL to download the application, the protocol handler, or the additional application.

9. The one or more computer-readable storage devices of claim 8, wherein:
    the receiving comprises receiving a request to look up the unrecognized file;
    the searching comprises searching one or more databases to find the application capable of opening the unrecognized file; and
    the sending comprises sending the URL to download the application.

10. The one or more computer-readable storage devices of claim 9, wherein the method further comprises sending, to the integrated program lookup browser, a message indicating that the application was not found if the application is not found in the one or more databases.

11. The one or more computer-readable storage devices of claim 8, wherein:
    the receiving comprises receiving a request to look up the unrecognized protocol;
    the searching comprises searching one or more databases to find the protocol handler capable of accessing the web page with the unrecognized protocol; and
    the sending comprises sending the URL to download the protocol handler.

12. The one or more computer-readable storage devices of claim 11, wherein the method further comprises sending, to the integrated program lookup browser, a message indicating that the protocol handler was not found if the protocol handler is not found in the one or more databases.

13. The one or more computer-readable storage devices of claim 8, wherein:
    the receiving comprises receiving a request to look up the unrecognized object;
    the searching comprises searching one or more databases to find the additional application capable of loading the unrecognized object; and
    the sending comprises sending the URL to download the additional application.

14. The one or more computer-readable storage devices of claim 13, wherein the method further comprises sending, to the integrated program lookup browser, a message indicating that that the additional application was not found if the additional application is not found in the one or more databases.

15. A server comprising:
    one or more databases; and
    at least a memory and a processor to implement a web service, the web service configured to:
        receive, at the web service, a request to look up an unrecognized file, the request received over a network from an integrated program lookup browser that is configured to handle unrecognized files, unrecognized protocols, and unrecognized objects, the program lookup web service configured to interface with the integrated program lookup browser over a network connection, the web service configured to search the one or more databases to find URLS of applications capable of opening unrecognized files, URLS of protocol handlers capable of accessing web pages with unrecognized protocols, and URLS of applications capable of loading unrecognized objects;
        search the one or more databases to find an application capable of opening the unrecognized file; and
        send, to the integrated program lookup browser, a URL to download the application.

16. The server of claim 15, wherein the web service is further configured to send, to the integrated program lookup browser, a message indicating that the application was not found if the application is not found in the one or more databases.

17. The server of claim 15, wherein the web service is further configured to:
    receive a request to look up an unrecognized protocol, the request received over a network from an integrated program lookup browser;
    search the one or more databases to find a protocol handler capable of accessing the web page with the unrecognized protocol; and
    send, to the integrated program lookup browser, a URL to download the protocol handler.

18. The server of claim 17, wherein the web service is further configured to send, to the integrated program lookup browser, a message indicating that the protocol handler was not found if the protocol handler is not found in the one or more databases.

19. The server of claim 15, wherein the web service is further configured to:
    receive a request to look up an unrecognized object, the request received over a network from an integrated program lookup browser;
    search the one or more databases to find an additional application capable of loading the unrecognized object; and
    send, to the integrated program lookup browser, a URL to download the additional application.

20. The server of claim 19, wherein the web service is further configured to send, to the integrated program lookup browser, a message indicating that the additional application was not found if the additional application is not found in the one or more databases.

* * * * *